F. M. SMITH.
SNATCH BLOCK.
APPLICATION FILED MAR. 2, 1914.
1,122,545.
Patented Dec. 29, 1914.
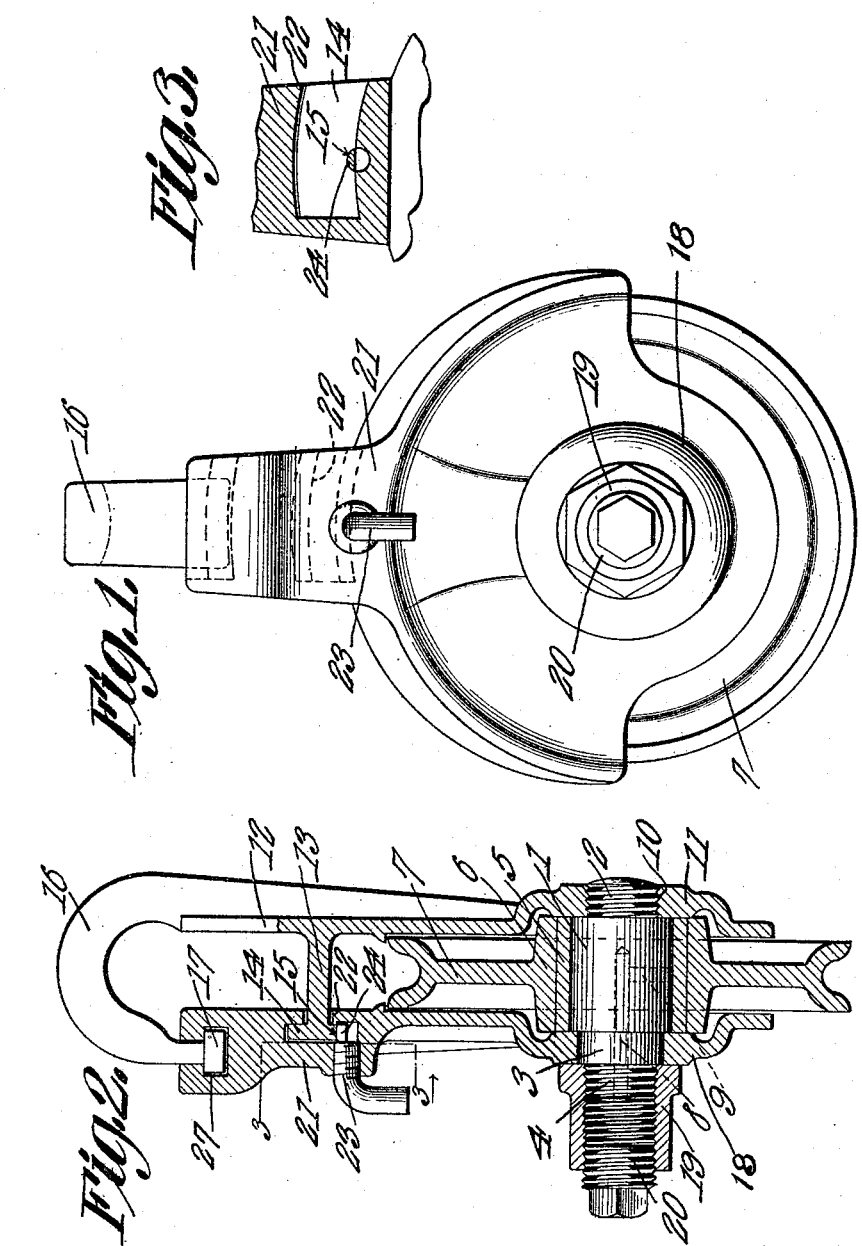
Witnesses
F. M. Smith,
Inventor
by C. A. Snow & Co.
Attorneys

UNITED STATES PATENT OFFICE.

FRANCIS M. SMITH, OF MAYGER, OREGON.

SNATCH-BLOCK.

1,122,545.  Specification of Letters Patent.  Patented Dec. 29, 1914.

Application filed March 2, 1914. Serial No. 821,956.

*To all whom it may concern:*

Be it known that I, FRANCIS M. SMITH, a citizen of the United States, residing at Mayger, in the county of Columbia and State of Oregon, have invented a new and useful Snatch-Block, of which the following is a specification.

The present invention relates to improvements in snatch blocks, and more particularly to the structure shown in my co-pending application filed October 13, 1913, Serial No. 794,976, one object of the present invention being the provision of a structure which is an improvement thereupon particularly in that the yoke is cast integral with one member of the snatch block while a novel locking means is carried by the other member for co-action with the fixed bridging element which is also carried by the yoke carried member.

A further object of the present invention is the provision of a snatch block, whereby the members thereof which properly support the pulley or sheave are so disposed as relates to the journal or supporting member of the sheave as to permit the movement of one member with the said journal as its axis so that the respective members may be separated to permit of the introduction or removal of a cable, there being coöperative locking means carried by the yoke and the adjacent portion of the members to lock such members in cable inclosing position.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a side elevation of a snatch block made according to and embodying the present invention. Fig. 2 is a longitudinal sectional view therethrough. Fig. 3 is a section taken on the line 3—3 of Fig. 2.

Referring to the drawings, the numeral 1 designates the spindle of the main connecting member of the present snatch block having the reduced threaded end 2, the reduced plain portion 3 and an oppositely disposed reduced threaded end 4. Surrounding the enlarged portion thereof is an anti-frictional metal bushing 5, which constitutes a bearing for the hub 6 of the pulley or sheave 7. Formed through the member 1 is a central channel or duct 8 which terminates in the radial duct 9 so that lubricant may be supplied to the pulley or sheave.

The member 11 is provided with a threaded aperture 10 for the reception of the threaded stem 2 and thus is locked fixedly to the member 1. Formed integral with member 11 is a flat portion 12 which has extending at right angles therefrom at the inner face of the same a connecting bar 13 provided with the T-shaped head 14, the upper edge being curved as illustrated in Fig. 3 upon a line concentric to the center of the member 1. The integral yoke 16 is fast to the member 11 and is provided with the T-shaped depending head 17, the purpose of which will presently appear. Formed in the under edge of the head 14 is a recess 15, the purpose of which will presently appear.

The member 18 is constructed with an aperture to surround the cylindrical portion 3 of the member 1 so that such member 18 may be oscillated relatively to the member 11, a locking interiorly threaded sleeve 19 being fitted upon the threaded end 4 of the member 1 and being provided with the threaded plug 20, which constitutes a means for compressing lubricant within the sleeve 19 and consequently through the ports 8 and 9 to supply the sheave. This sleeve 19 also constitutes a means for locking the parts relatively together as the inner face thereof abuts the shouldered portion of the cylindrical portion 3 and is thus locked upon the member 1.

The shank portion 21 of the member 18 is provided with a T-shaped in cross section slot 22 which opens upon the inner face thereof, as illustrated in Fig. 2, and is disposed to receive the head 14 of the connecting bar 13, the locking member 23 being disposed to present its semi-circular and reduced end 24 into the recess 15 to lock the parts in the position as shown in Figs. 1 and 2. By this means the member 23 may be rotated a half revolution to place the locking end 24 out of the recess 15 and thus permit the member 18 to be oscillated to one side so that the head 14 is removed from out of the slot 22. Formed in the extreme upper end of the extension 21 is an inverted T-shaped recess 27 for the reception of the T-shaped head 17 of the yoke 16. Thus the parts when assembled, as shown, constitute a means for properly surrounding a cable upon the sheave or pulley 7, and yet through the manipulation of the locking member 23, the member 18 may be moved to one side so that the connecting bar 13 and the yoke 16 will be disconnected therefrom to permit of the easy removal or introduction of the cable.

What is claimed is:

1. A snatch block, including a spindle, a sheave mounted upon the spindle, a frame composed of two separable members, one of said members being fixedly connected to one end of the spindle, while the other of said members is mounted to rotate upon the spindle, a yoke carried by the fixed member, an inwardly projecting bridging member carried by the fixed member, means carried by the swinging member for engaging the yoke, a separate means carried by the swinging member for engaging the bridging member, and a lock carried by the swinging member for engaging the bridging member to hold the parts against swinging movement.

2. A snatch block, including a spindle, a sheave mounted upon the spindle, a frame composed of two separable members, one of said members being fixedly connected to one end of the spindle while the other of said members is mounted to rotate upon the spindle, a yoke carried by the fixed member, an inwardly projecting bridging member carried by the fixed member, means carried by the swinging member for engaging the yoke, a separate means carried by the swinging member for engaging the bridging member, said bridging member being provided with a recess in its end, and a locking pin mounted in the swinging member for movement into and out of the recess.

In testimony that I claim the foregoing as my own, I have hereto affixed my signature in the presence of two witnesses.

FRANCIS M. SMITH.

Witnesses:
FRANK A. POMEROY,
FRED SEYDELL.

Copies of this patent may be obtained for five cents each, by addressing the "Commissioner of Patents, Washington, D. C."